United States Patent [19]

Akselrud et al.

[11] Patent Number: 5,200,207
[45] Date of Patent: Apr. 6, 1993

[54] HOT RUNNER SYSTEM FOR COINJECTION

[75] Inventors: Vitaly Akselrud, Richmond Hill; Stefan von Buren, Toronto, both of Canada

[73] Assignee: Husky Injection Molding Systems Ltd., Bolton, Canada

[21] Appl. No.: 712,567

[22] Filed: Jun. 10, 1991

[51] Int. Cl.$^5$ .................. B29C 45/16; B29C 45/20; B29C 45/38

[52] U.S. Cl. ................................. 425/557; 425/130; 425/561; 425/563; 425/572

[58] Field of Search .............. 425/130, 134, 147, 544, 425/172, 557, 169, 558, 562, 572, 585, 586, 588, 238, 239, 240, 241, 225, 561; 264/297.2, 328.8, 328.17, 328.19, 245, 255, 39, 40.1

[56] References Cited

U.S. PATENT DOCUMENTS

| | | | |
|---|---|---|---|
| 1,144,583 | 6/1915 | Brown | 222/249 |
| 1,782,704 | 11/1930 | Woodruff | 222/249 |
| 1,963,646 | 6/1934 | Burrell | 222/249 |
| 2,265,995 | 12/1941 | Beyerkin | 425/563 |
| 2,427,680 | 9/1947 | Leonard | 222/250 |
| 2,666,229 | 1/1954 | Vogt | 425/239 |
| 2,804,648 | 9/1957 | Strauss | 222/250 |
| 2,872,082 | 2/1959 | Neugebauer | 222/249 |
| 3,001,234 | 9/1961 | Renier | 425/557 |
| 3,224,642 | 12/1965 | De Martelaere et al. | 222/250 |
| 3,390,433 | 7/1968 | Barnett et al. | 264/328.19 |
| 4,279,360 | 7/1981 | Hauser | 222/1 |
| 4,289,468 | 9/1981 | von Holdt | 425/572 |
| 4,386,716 | 6/1983 | Buck | 222/250 |
| 4,643,665 | 2/1987 | Zeiger | 425/563 |
| 4,717,324 | 1/1988 | Schad et al. | 425/130 |
| 5,011,399 | 4/1991 | Farrell | |

Primary Examiner—Jill L. Heitbrink
Attorney, Agent, or Firm—Bachman & LaPointe

[57] ABSTRACT

A hot runner system for injecting precise quantities of at least one resin advancing under pressure from a resin source wherein the system includes a shooting pot having a piston with opposed working surfaces which divide the shooting pot into at least two reservoirs. Resin under pressure is switched cyclically from one reservoir to the other whereby the piston is driven by resin under pressure to purge one reservoir while the other reservoir is loaded.

6 Claims, 17 Drawing Sheets

HOT RUNNER SYSTEM FOR COINJECTION

FIELD OF THE INVENTION

The present invention relates to injection molding machines and relates, in particular, to hot runner systems utilizing shooting pots which are operative to inject or advance two or more resins, in sequence or simultaneously, in precise quantities to large molds having a plurality of mold cavities.

BACKGROUND OF THE INVENTION

In prior art hot runner systems, including shooting pots such as disclosed in U.S. Pat. No. 4,717,324, it is apparent that shooting pots have large space requirements, especially when the shooting pots are individual to each mold cavity.

In addition, the prior art arrangements require accessory elements such as pneumatic piston-cylinder assemblies and piston rods to actuate the shooting pots. Obviously these accessories have additional space requirements.

SUMMARY OF THE INVENTION

Consequently, it is a prime feature of the present invention to provide a hot runner system including shooting pots wherein the pots are actuated by pressure of resin being advanced or injected.

That is, a given resin advanced under pressure from a single source such as an extruder to a shooting pot is switched, selectively and cyclically, by suitable valve means to opposed sides of a free floating piston effective to (a) load the shooting pot with resin on one side of the floating piston and (b) expel resin from the shooting pot on the opposite side of the floating piston loaded during a previous cycle.

The piston divides the shooting pot into at least two reservoirs bounded by opposed working surfaces of the piston. There is no access from reservoir to reservoir through the shooting pot piston.

Thus, the present invention provides resin actuated shooting pots.

In addition, it is an object of the present invention to provide a shooting pot capable of serving a plurality of mold cavities simultaneously or sequentially. That is, one shooting can serve more than one mold cavity.

It is a further object of the present invention to provide a free floating piston in a shooting pot which takes the form of a solid cylinder or a sleeve-like member.

A still further object of the invention is the provision of a free floating piston in a shooting pot which is mounted in a rotatable member.

A further feature of the invention is the provision of a free floating piston in a shooting pot driven by a resin under pressure and mounted in a rotatable member wherein the pot is loaded at a first end and discharges resin from a second end cyclically.

That is, the resin always enters the shooting pot from the first end and always discharges from the second end.

A further feature of the invention is the provision of a free floating piston in a shooting pot having opposed working surfaces wherein one working surface is loaded and powered by a first resin under pressure and a second working surface is loaded and powered by a second resin.

This is, one end of the shooting pot is loaded with resin A and the opposite end is loaded with resin A′ cyclically and sequentially so that resin A drives the piston to eject resin A′ and resin A′ drives the piston to eject resin A in step by step or cyclic fashion.

A further feature of the invention is the provision of valve means for directly resin A and resin A′ selectively to opposed sides of a floating piston.

A still further feature of the invention is the provision of valve means for blocking access of resin A and resin A′ to both working surfaces of said floating piston while providing access for resin B from its source to a mold cavity bypassing a shooting pot.

A further feature of the invention is the provision of a shooting pot operable to deliver metered quantities of at least two different resins to a single nozzle via a common channel to a mold cavity serviced by the single nozzle.

A further feature of the invention is the provision of means and methods for purging shooting pots and melt channels of residual resins after shutdown.

This feature includes purging channels which bypass the shooting pots as well as those channels in circuit with the shooting pots clearing the resin channels from the respective resin sources through the mold cavities.

A still further feature of the present invention is the provision of a shooting pot having free floating piston mounted in a rotary housing to insure that resin is advanced positively in a predetermined direction. This feature is especially important to avoid degradation of resin when relatively small quantities of resin are advanced.

That is, when small quantities of a resin, such as a barrier resin (in a multi-layered preform molded by the apparatus and methods of the present invention) are injected, there is a risk of resin degradation because the main body of the resin "shuttles" back and forth and "old" resin is never fully flushed out of the shooting pot.

For example, a barrier resin frequently may represent one percent (1%) or less by weight of the total mass of a multi-layered preform and a reciprocating double working face floating piston may never flush its resin pots or resin reservoirs fully.

An injection molding machine including resin conduit means providing a path for a resin advancing under pressure from a resin source to at least one resin mold cavity embracing certain principles of the present invention may comprise a cylinder means in circuit with said conduit means, a free floating piston means within said cylinder means, said piston means having at least one working surface intersecting said path whereby said advancing resin contacts said working surface and is operable to drive the piston means in a first direction.

The language "free floating piston" is intended to denote a piston that is free of connecting rods for driving the piston or driven by the piston.

An injection molding machine including resin conduit means providing a path for resin advancing under pressure from a resin source to at least one mold cavity wherein a shooting pot is in circuit with the conduit means, said shooting pot comprising a piston means movable freely within a cylinder means, said piston means comprising an impervious partition having first and second working surfaces dividing the cylinder means into first and second reservoirs whereby said piston means is operable to eject resin from said first and second reservoirs toward said at least one mold cavity, a method of operating the shooting pot embracing certain other principles of the present invention may comprise the steps of directing said resin under pressure to said first reservoir against said first working surface whereby said first reservoir is loaded and said piston means is driven toward said second reservoir, thereafter directing said resin under pressure to said second reservoir against said second working surface whereby said second reservoir is loaded and said piston means is driven toward said first reservoir whereby resin in said first reservoir is ejected.

Other features and advantages of the present invention will become more apparent from an examination of the succeeding specification when read in conjunction with the appended drawings, in which;

DETAILED DESCRIPTION OF THE PREFERRED EMBODIMENTS

Figure 1:
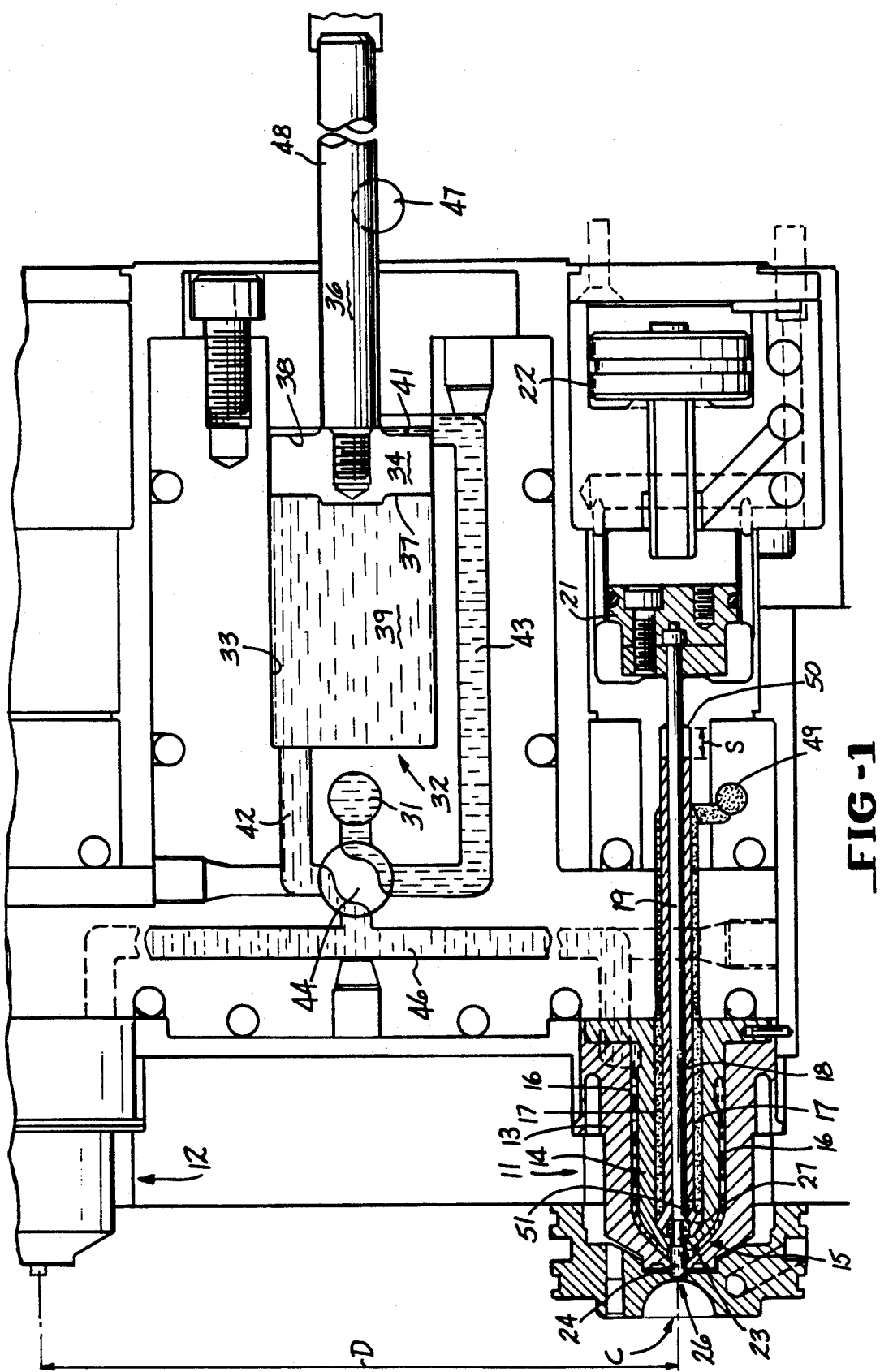
FIG. 1 is a schematic layout of a hot runner system for an injection molding machine showing a shooting pot for resin A and a shooting pot for resin B, both in a starting position, or stage 1.

In FIGS. 1 through 10, which show, in stages, a complete coinjection cycle from the origin of the several resins to the respective mold cavities, identical elements are assigned the same reference numeral.

In FIG. 1, two mold cavities C (only one shown) spaced apart a pitch distance D are serviced by two identical coinjection nozzles 11 and 12. Details of nozzle 11 are shown, and it is to be understood that nozzle 12 is of the same internal configuration.

Nozzle 11 contains a shooting pot indicated generally by the reference numeral 15 and includes a housing 13 encircling and radially spaced from a sleeve 14 providing a first annular resin conduit or channel 16 in well-known fashion. A second annular resin channel 17 is defined by the inside diameter of the sleeve 14 and the outside diameter of a free floating shooting pot piston 18. The channel 17 also defines a reservoir established by shooting pot piston 18. The piston 18 is tubular in cross-section and houses, in a snug, sliding fit, nozzle valve stem 19 actuated in stages by pneumatic pistons 21 and 22 in the manner disclosed and described in U.S. Pat. No. 4,966,545 (of common Assignee) incorporated herein by this reference.

The valve stem 19, which operates to open and close access of channel 16 and a shooting pot reservoir, selectively, to mold cavity C is connected at one end to piston 21. The opposite end includes a reduced diameter segment 23 and a sealing segment 24. The sealing segment 24 is operable to close gate 26 in nozzle housing 13. The nozzle gate is shown closed in FIG. 1 which represents the start of a molding cycle or stage 1.

Shooting pot 15 includes piston 18 formed with a head portion 27 having opposed first and second working surfaces 28 and 29, respectively, which are impinged, cyclically, by resin under pressure to drive the piston 18 to and fro through a definite stroke, the length of which is indicated by the letter S in FIG. 1.

The piston 18 divides the shooting pot into two reservoirs. The first reservoir 20 (FIG. 3) is bounded by working surface 28, and the second channel or reservoir 17 is bounded by working surface 29.

Referring to FIG. 1, resin B emerging under pressure from supply aperture 49 drives free floating piston 18 in a manner which will become more apparent as the specification proceeds.

A resin A emerging under pressure from supply aperture 31 originates from a resin source such as an extruder (not shown) supplies a second shooting pot indicated generally at 32.

The shooting pot 32 comprises cylinder 33 and free floating piston 34 terminating in a guide rod 36.

This shooting pot also has two working surfaces, namely, surface 37 and opposed surface 38.

Here again, these piston working surfaces divide the shooting pot into a first reservoir 39 and a second reservoir 41, the piston serving as an impervious partition between reservoirs.

Resin A is supplied to the respective reservoirs via conduits 42 and 43 under control of rotary or slide valve 44 which is also operable to direct Resin A from a loaded reservoir to nozzles 11 and 12 via conduit 46.

For example, in FIG. 1 (stage 1 of a cycle) first reservoir 39 is loaded and valve 44 is set to connect the reservoir 39 to nozzles 11 and 12.

The valve setting also connects the resin A supply aperture 31 to the second reservoir 41 so that in timed sequence, resin A advancing under pressure from its source, will impinge upon working surface 38 to drive piston 34 to advance a metered quantity of resin A to mold cavities fed by nozzles 11 and 12 via conduit 46 and nozzle channel 16.

As will be more apparent hereinafter, adjustment means are provided for changing the stroke of a free floating piston thereby changing the volume of the respective reservoirs on an individual shooting pot basis to establish and to maintain the volume of each shooting pot "shot" precisely.

The reference numeral 47 designates a light beam which is read by a photo electric cell (not shown) to signal movement of the piston 34.

In FIG. 1, the beam is blocked by the tail 48 of guide rod 36.

It is to be understood that volumes of the respective reservoirs and of the path traversed by resin A to the respective mold cavities is a known value so that a given stroke of piston 34 delivers a predetermined, precise quantity of resin A..

This precise delivery feature is also an attribute of all embodiments of shooting pots disclosed and described in the present application.

Obviously, volumes can be adjusted by changing the size of the shooting pot cylinder, its piston stroke, or any reasonable combination or permutation of all changes.

Resin B emerges under pressure from its supply aperture 49 advanced from a source such as an extruder (not shown) and loads reservoir or channel 17.

As will be more apparent hereinafter, various relative positions between the nozzle valve stem 19 and the piston effect a valve action to connect the channel 17 to the reduced diameter segment 23 (of valve stem 19) via piston port 51 to load the reservoir 20 bounded by working surface 28, or in the alternative, close port 51 in shooting pot piston 18. Port 51 is shown closed by valve stem 19 in FIG. 1.

Figure 2:
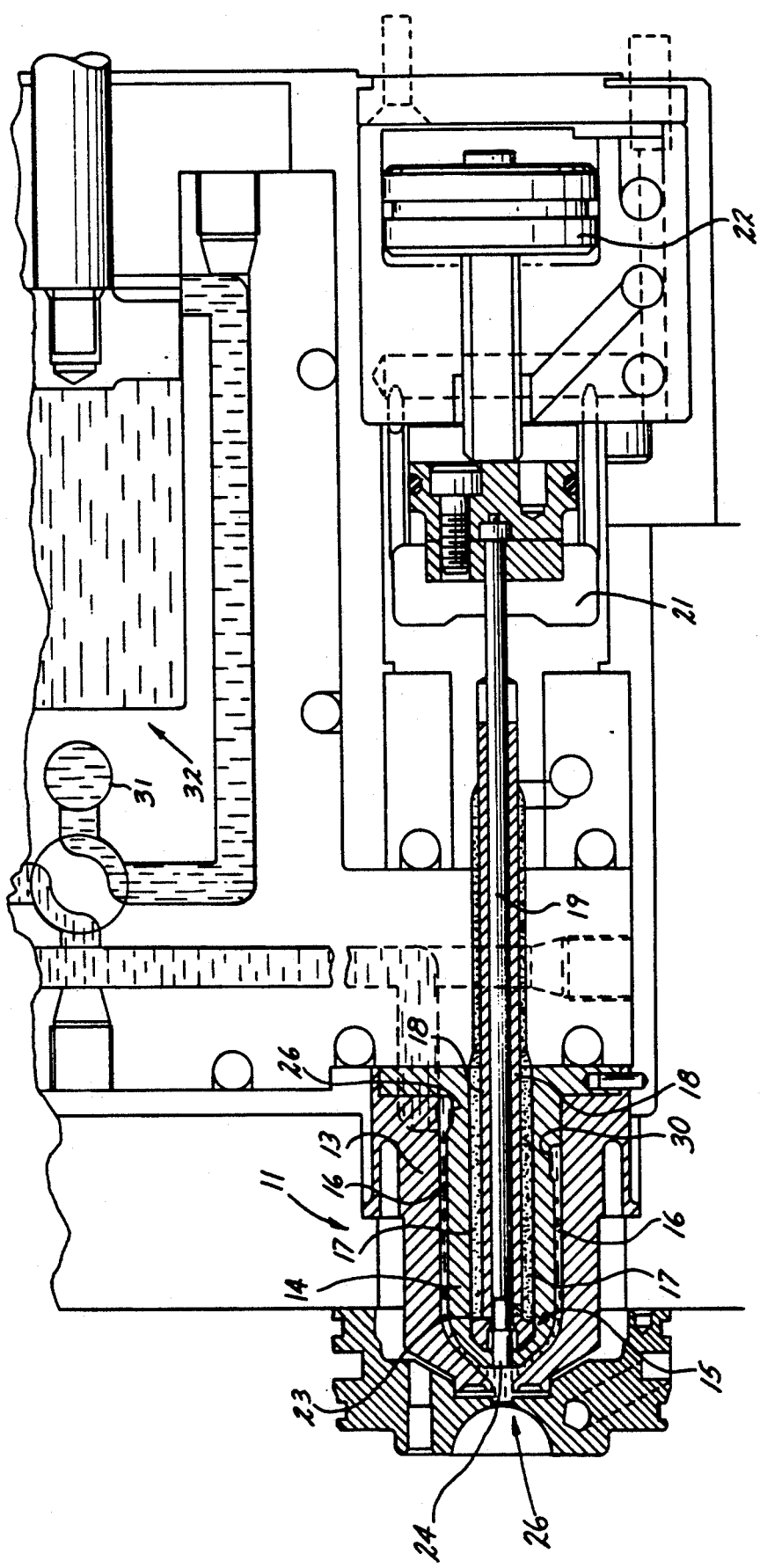
FIG. 2 is a portion of the layout of FIG. 1 showing the nozzle valve stem of resin B shooting pot in a neutral position, stage 2.

FIG. 2 shows pneumatic piston 21 retracted into contact with pneumatic piston 22 while piston 22 remains in its forward position. The valve stem 19 has retracted correspondingly to establish space in first reservoir 20 of shooting pot 15. At the same time, reduced diameter segment of valve stem 19 has been aligned with piston port 51 to provide passage for resin B from channel 17 to reservoir 20.

Figure 3:
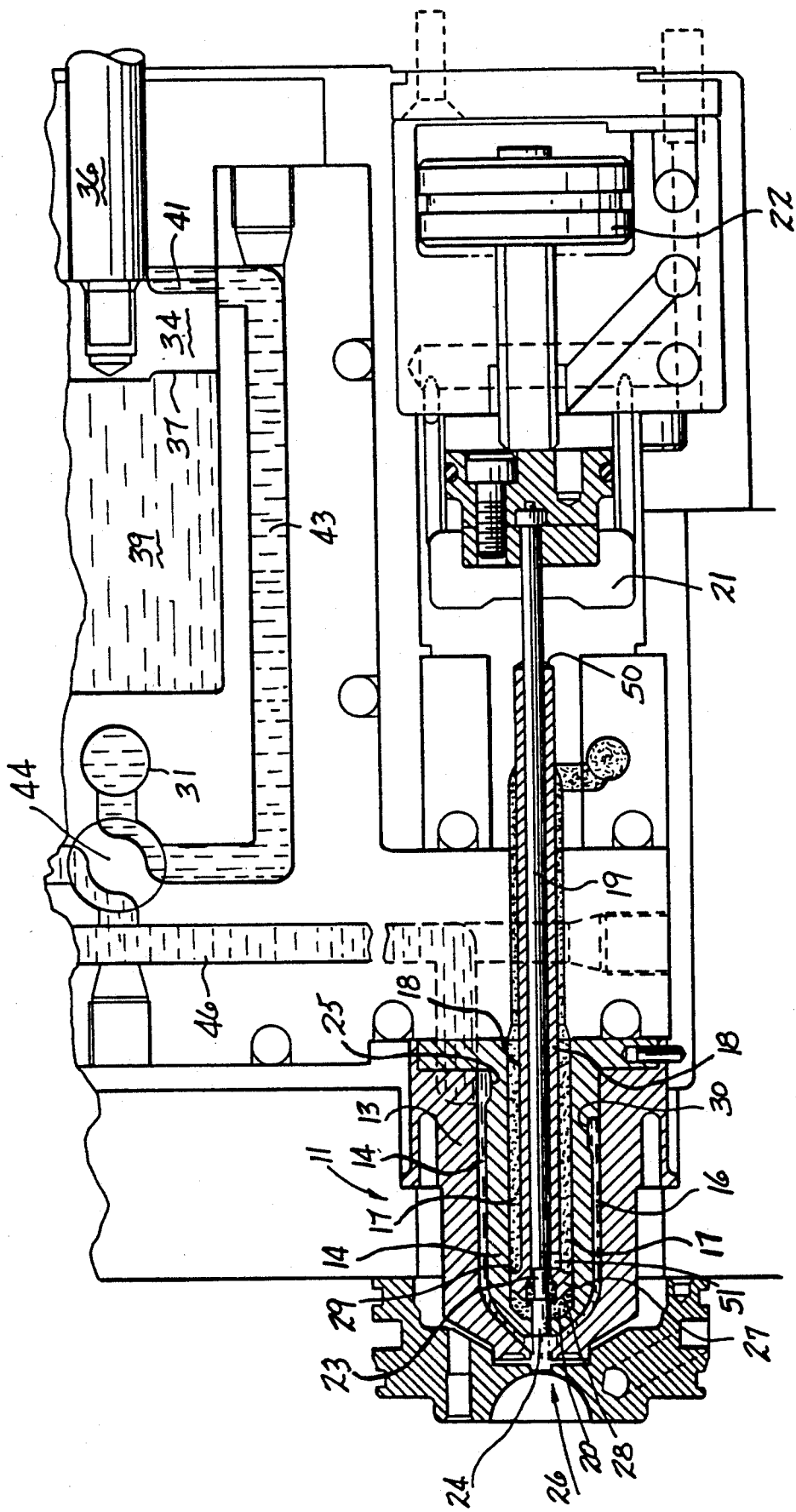
FIG. 3 is a portion of the layout of FIG. 1 showing resin B shooting pot charged, stage 3.

As is more apparent in FIG. 3, the injection unit (not shown) supplying resin B is actuated to feed resin B through aperture 49, channel 17 and port 51 to load reservoir 20. This occurrence causes resin B, under pressure, to react against working surface 28 of piston head 27 to drive piston 18 to the right into abutment with stop 50.

It is to be noted that the port 51 is a valve element and is entirely for the purpose of loading reservoir 20 so that the piston 18 is impervious to the transfer of resin from reservoir to reservoir when the piston is driven by resin B under pressure in reciprocatory fashion.

This occurrence happens as a result of the differential areas of working surfaces 28 and 29, i.e., area of surface 28 is larger than the surface 29.

Note that the relative position between the piston 18 and the valve stem 19 in FIG. 3 is such that port 51 is closed, reservoir 20 is loaded with a precise known volume of resin B and the reservoir 20 is closed to the mold cavity.

Figure 4:
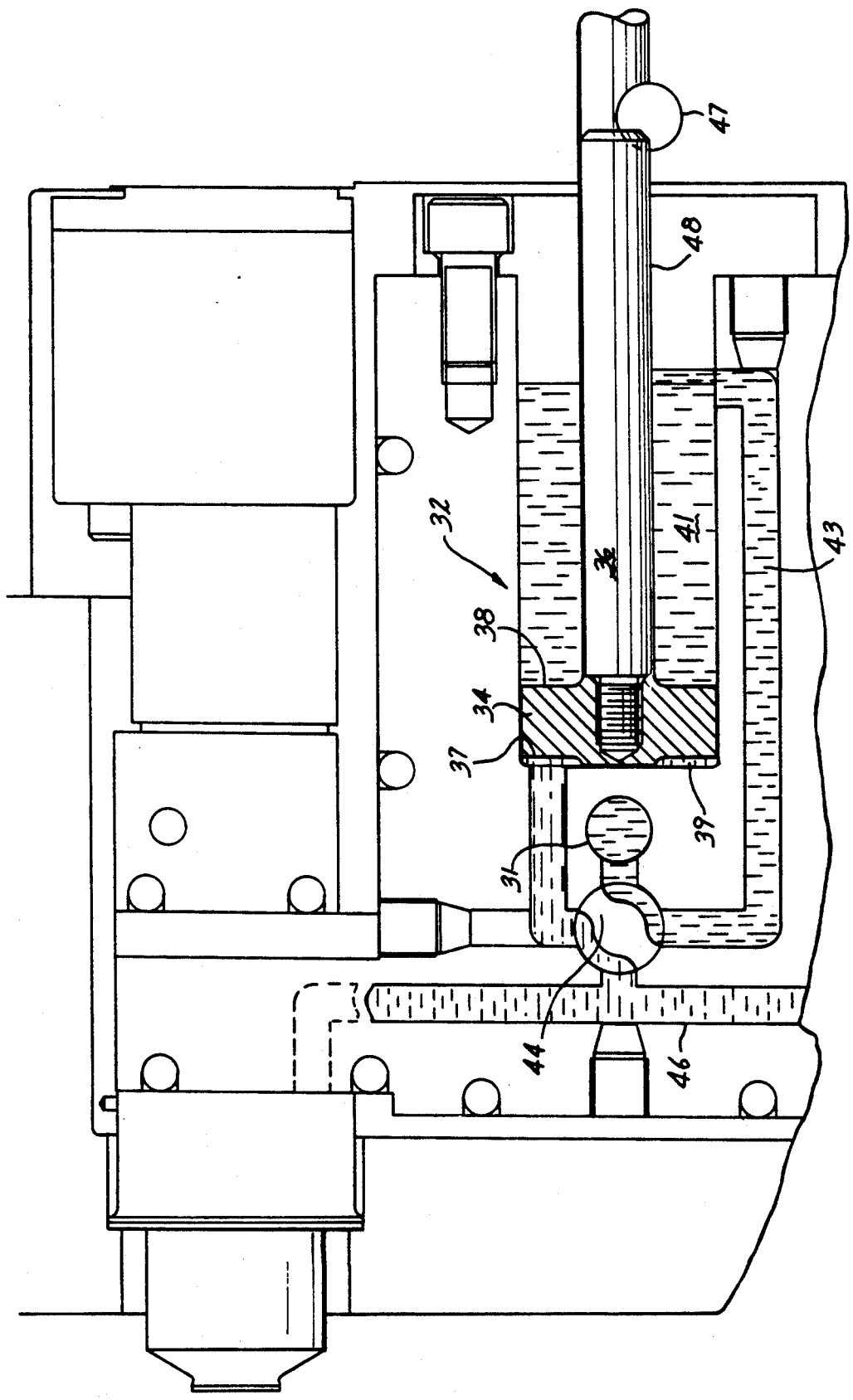
FIG. 4 shows resin A shooting pot piston advanced to discharge left reservoir while right reservoir is charged, stage 4.

Next, as shown in FIG. 4, (fourth stage), the injection unit of resin A is actuated whereupon the resin under pressure emerges from supply aperture 31 and impinges upon working surface 38 of piston 34 of shooting pot 32 to drive the piston to the left causing working face 37 to feed resin A to nozzles 11 and 12 and into their mating mold cavities C (only one shown) via conduits 42, 46 and nozzle channel 16. Note that nozzle channel 16 has an angled infeed, as evidenced by the reference numerals 25 and 30, to equalize flow.

During this occurrence, the right or second reservoir 41 of shooting pot 32 is loaded.

Figure 5:
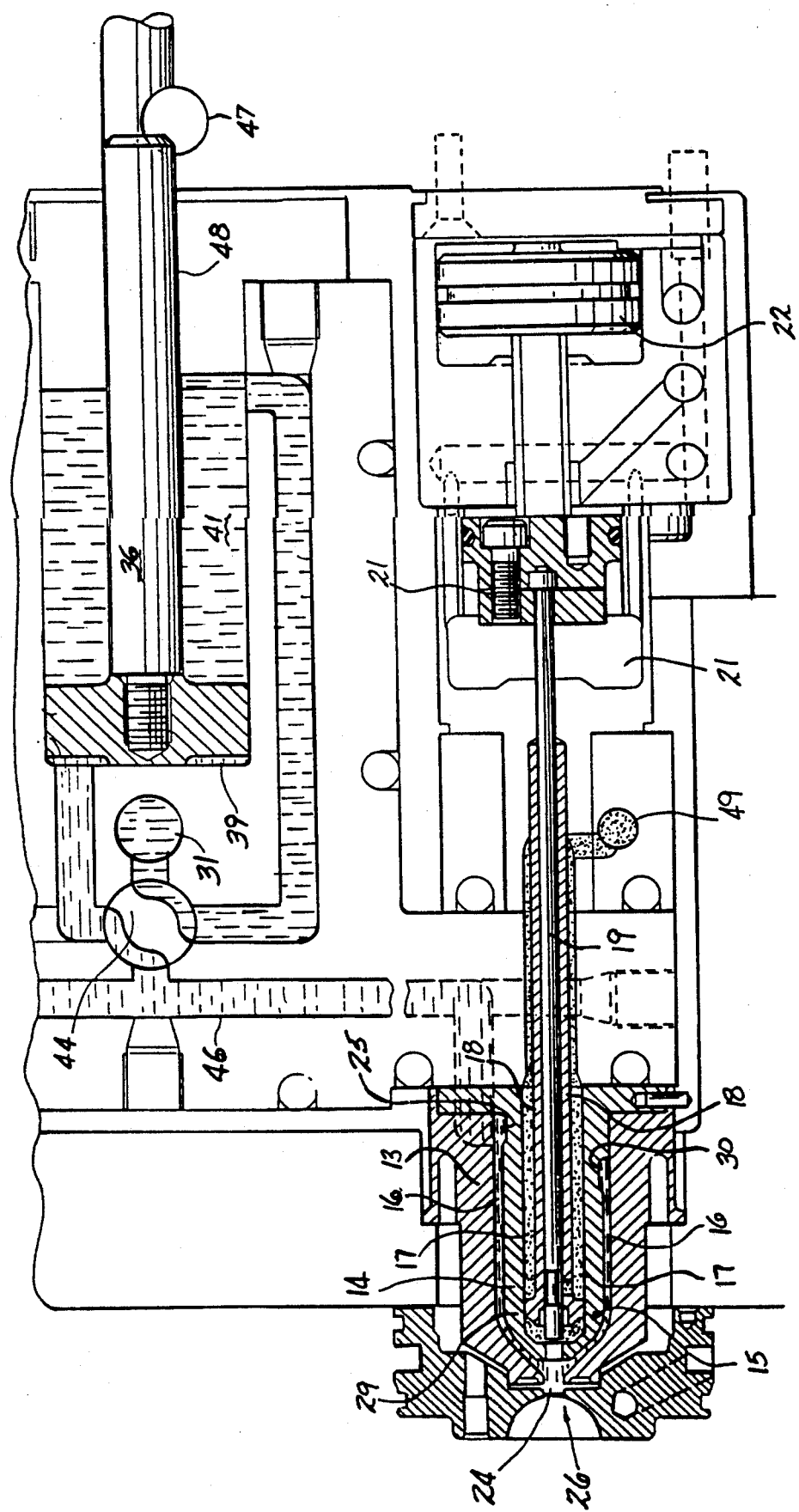
FIG. 5 shows resin B shooting pot valve stem fully open poised to eject resin B, stage 5.

Next, as shown in FIG. 5, (stage 5), the valve stem pistons 21 and 22 are retracted in unison to open reservoir 20 of shooting pot 15 to nozzle gate 26 leading to complementary mold cavity C.

In sequence, the injection unit (not shown) providing resin B is activated. Resin B emerging from supply aperture 49 flows into second channel or reservoir 17, impinging upon working surface 29. This occurrence drives shooting pot piston 18 to the left, (see FIG. 6), to inject resin B into the open mold cavity.

Even though nozzle channel 16 loaded with resin A is exposed, there is no backflow of resin B into channel 16 because of the resistance provided by the larger diameter resin A shooting pot piston 34.

Thus, a metered shot of resin B injected into the mold cavity is assured.

Figure 6:
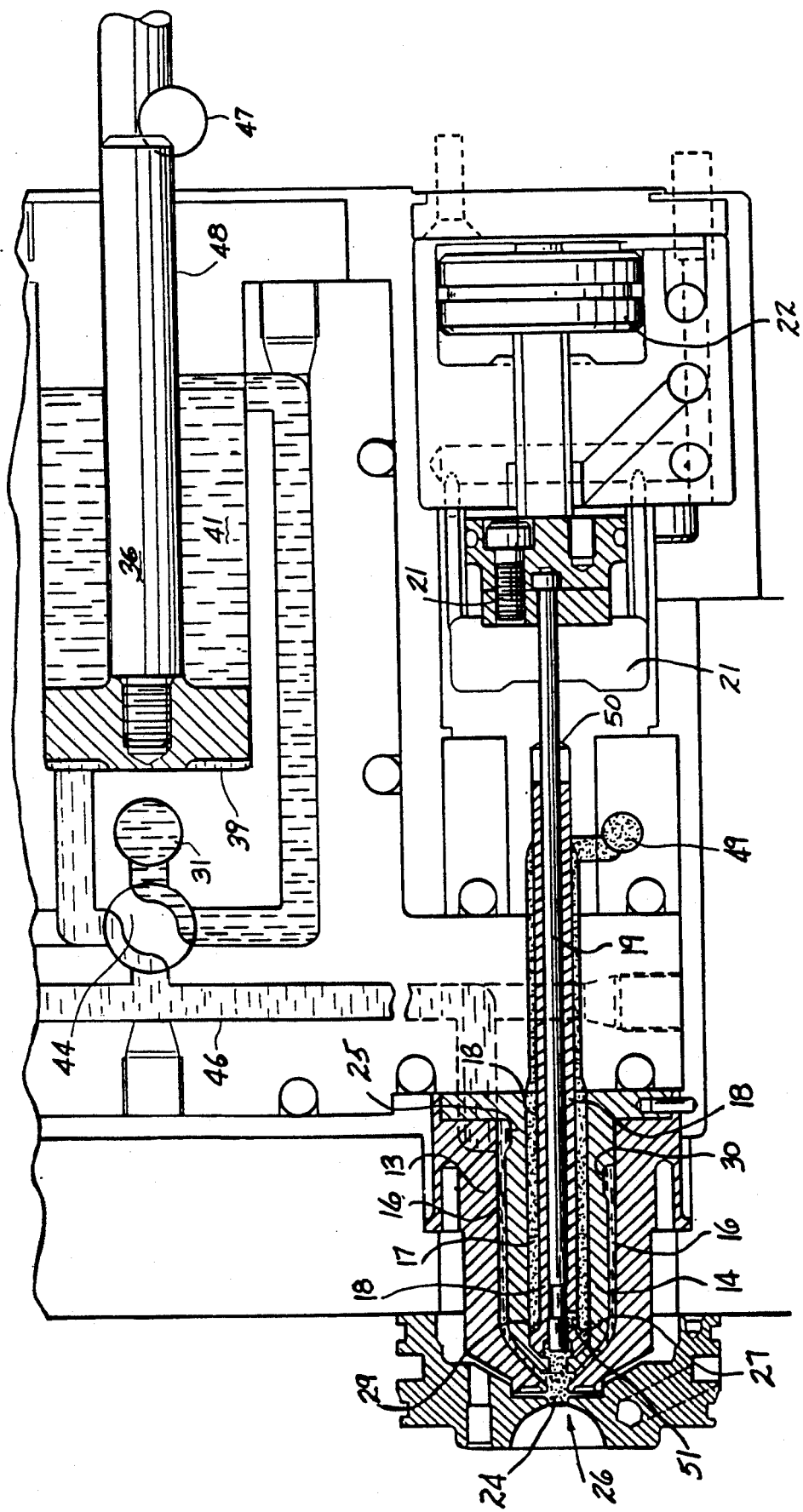
FIG. 6 shows ejection of resin B by its shooting pot piston, stage 6.
Figure 7:
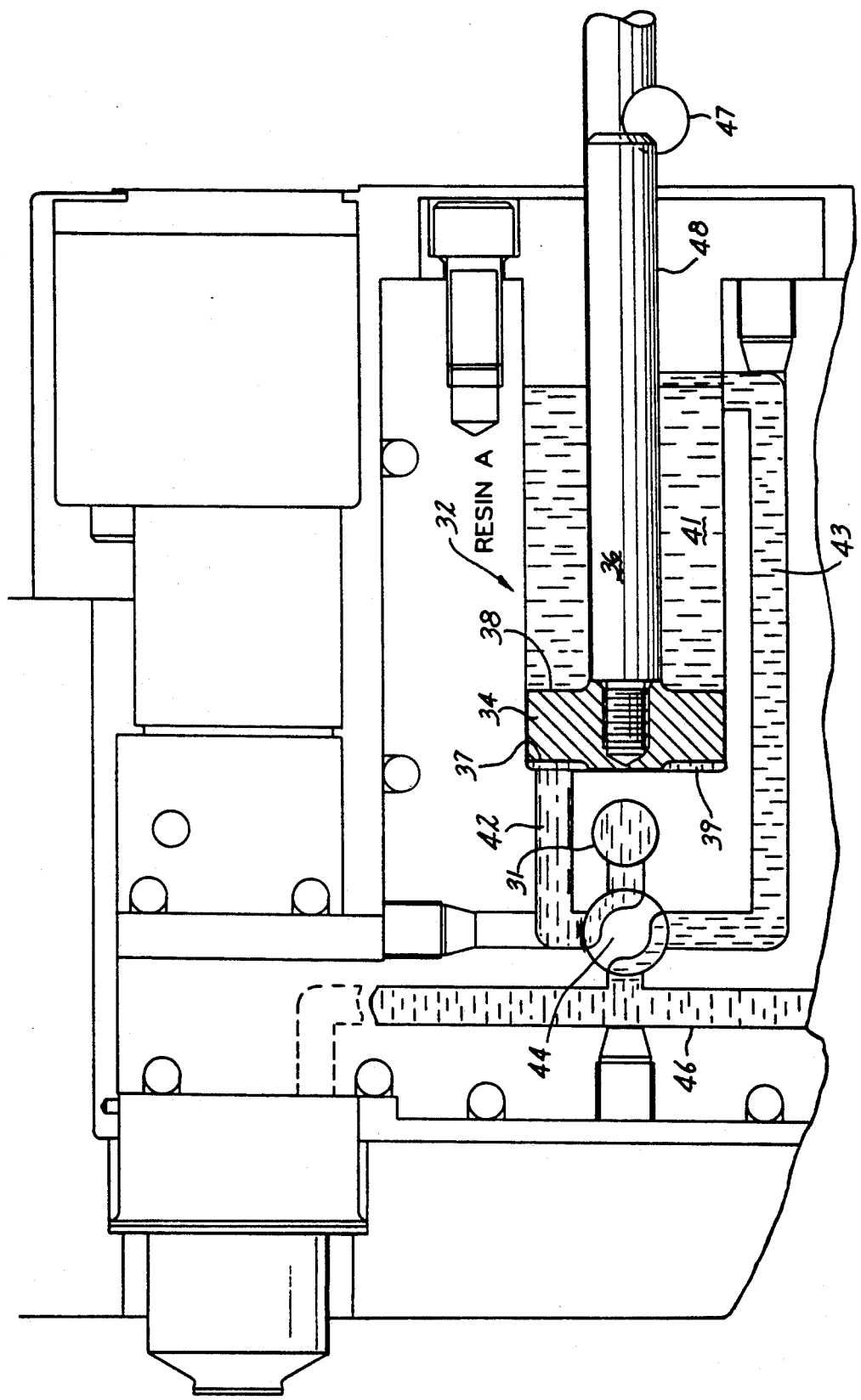
FIG. 7 shows the resin A shooting pot (right reservoir) open to mold cavities, stage 7.
Figure 8:
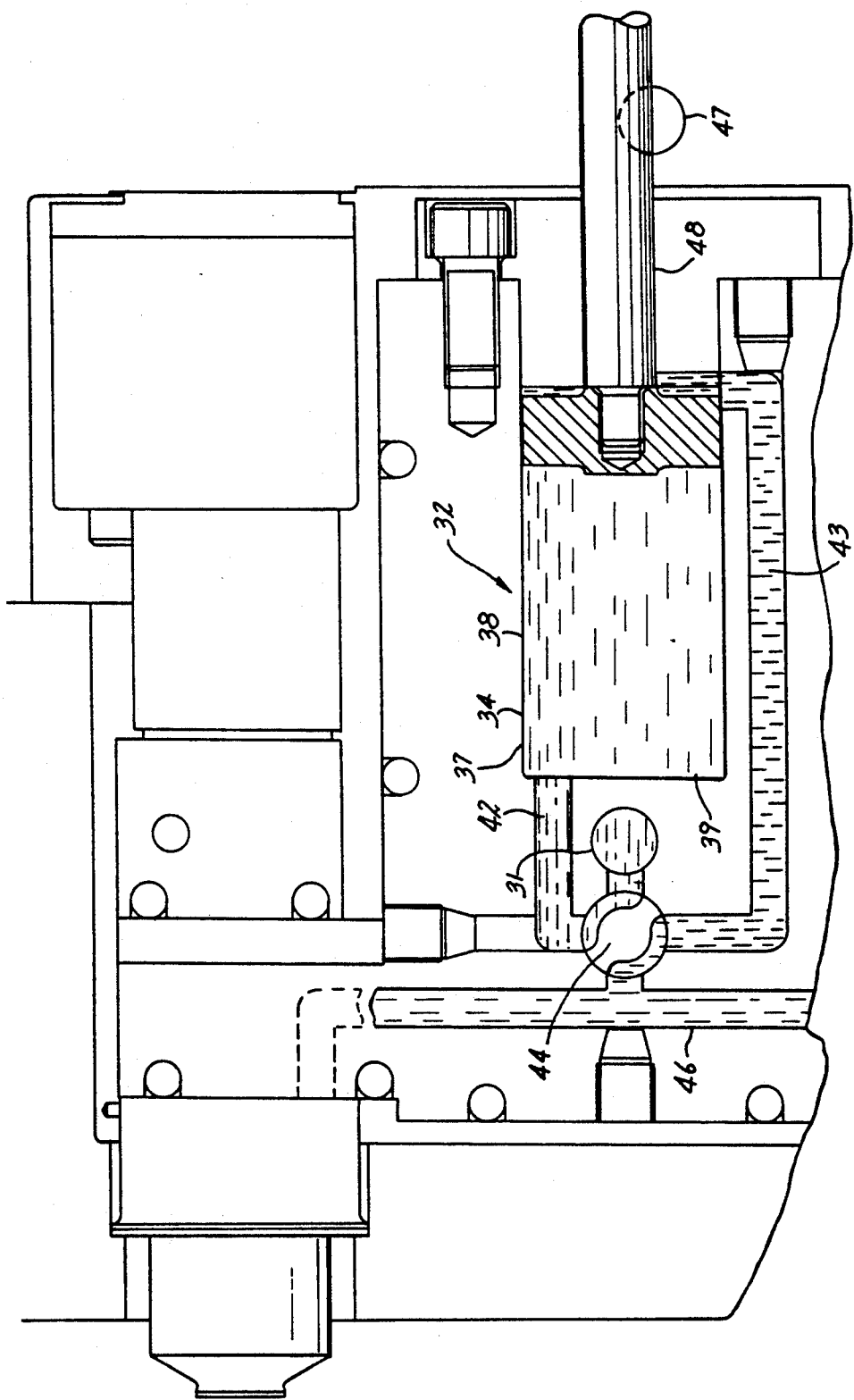
FIG. 8 shows the resin A shooting pot piston retracted and left reservoir charged, stage 8.

In timed sequence, the valve 44 is rotated from the position of FIG. 6 (stage 6) to the position of FIG. 7, establishing stage 7. This opens reservoir 41 to nozzles and 12 via conduits 43 and 46. Note that tail 48 has cleared light beam 47 signalling completion of the injection.

The resin A injection unit (not shown) is activated (FIG. 8, stage 8) whereby resin A is advanced under pressure through aperture 31 and conduit 42, entering reservoir 39 impinging upon working surface 37 operable to drive piston 34 to the right to displace resin A from reservoir 41 while loading (filling) reservoir 39.

This occurrence advances resin A through open gates 26 (only one shown) via conduit 43, valve 44 and conduit 46 to pack the mold cavities with resin A fully. Packing pressure of resin A is maintained upon mold cavities as molded preform cools.

During this injection sequence of resin A, nozzle valve stem 19 remains retracted backed up by pistons 21 and 22. Shooting pot piston 18 is driven to the right (FIG. into abutment with its stop 50 by the pressure of resin A acting upon working surface 28 of piston 18. During the next cycle, injection pressure of resin B acting upon working surface 29 returns shooting pot piston 18 to the position of stage 3, FIG. 3.

Figure 9:
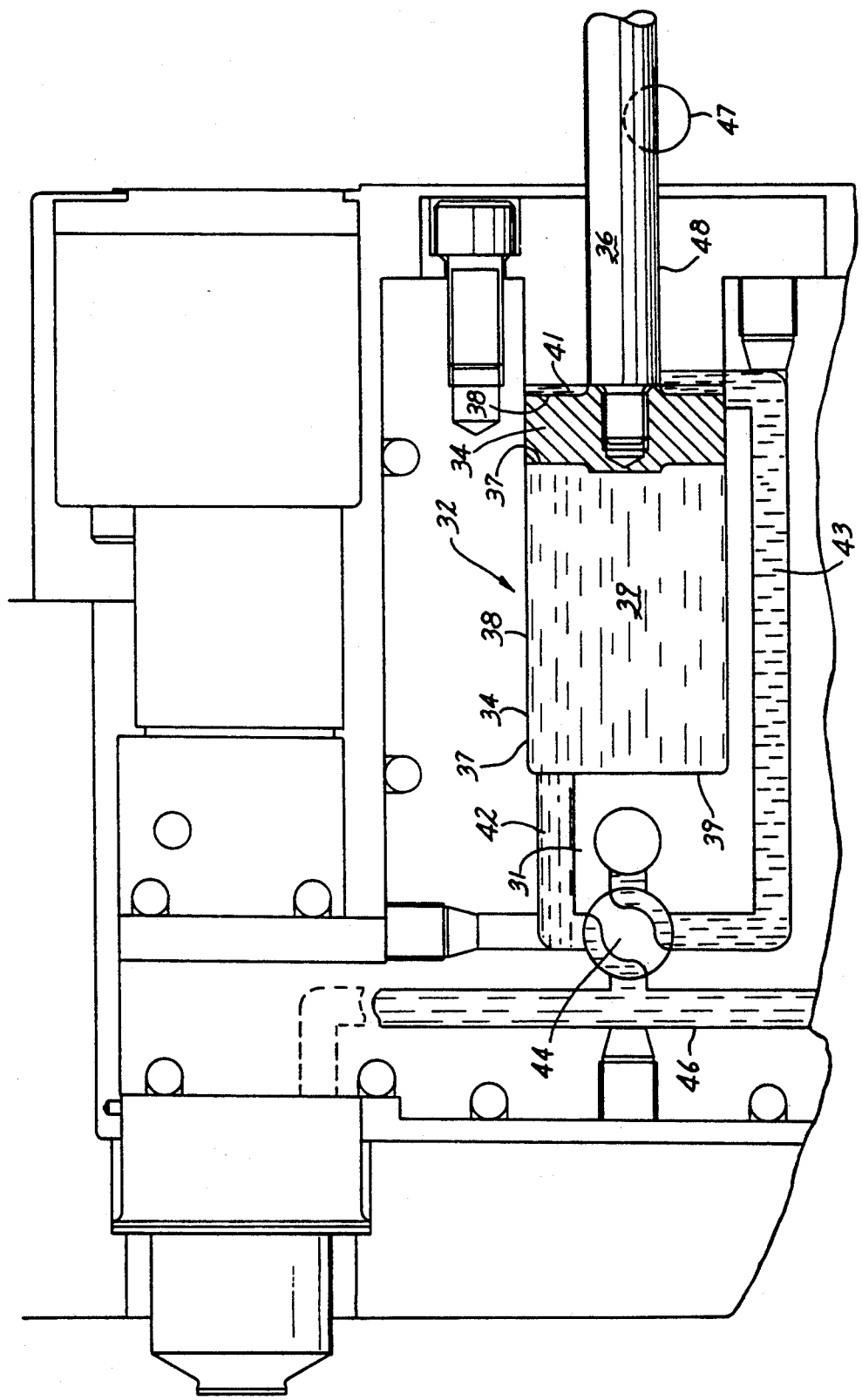
FIG. 9 shows the resin A shooting pot left reservoir opened to mold cavities, stage 9.

The parts molded, having been packed by the second shot of resin A, valve 44, is returned to the position of FIG. 9, stage 9, for the start of the next cycle.

Note that the stage 9 position of valves 44 corresponds to its position in stage 1.

Figure 10:
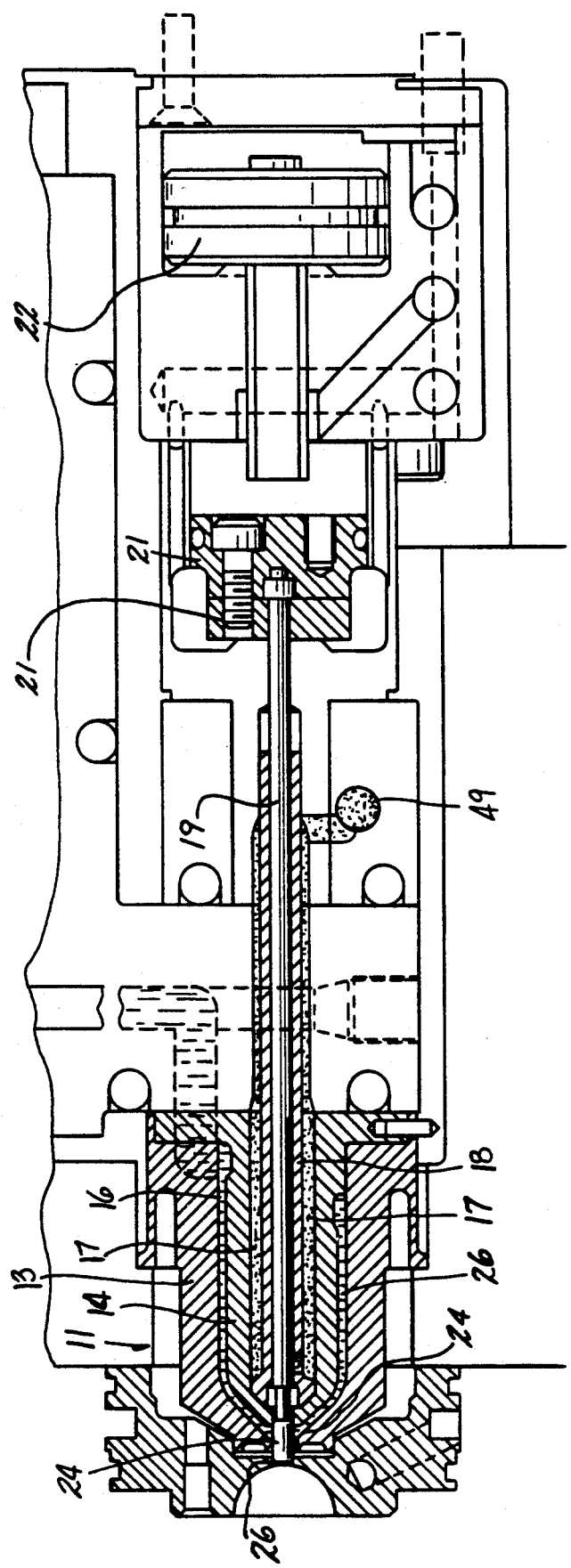
FIG. 10 shows the resin A and resin B shooting pots closed to mold cavities having completed a cycle, stage 10.

Next, as shown in FIG. 10, stage 10, pneumatic pistons 21 and 22 are actuated to advance nozzle valve stem 19 to the left to close nozzle gate 26. The slug of resin A in front of the stem is packed into the part or backflows partly into channel 16.

Thus, completing the molding cycle so that the mold can be opened, part ejected and the mold is closed in anticipation of the next cycle comprising stages 1 through 10.

Figure 11:
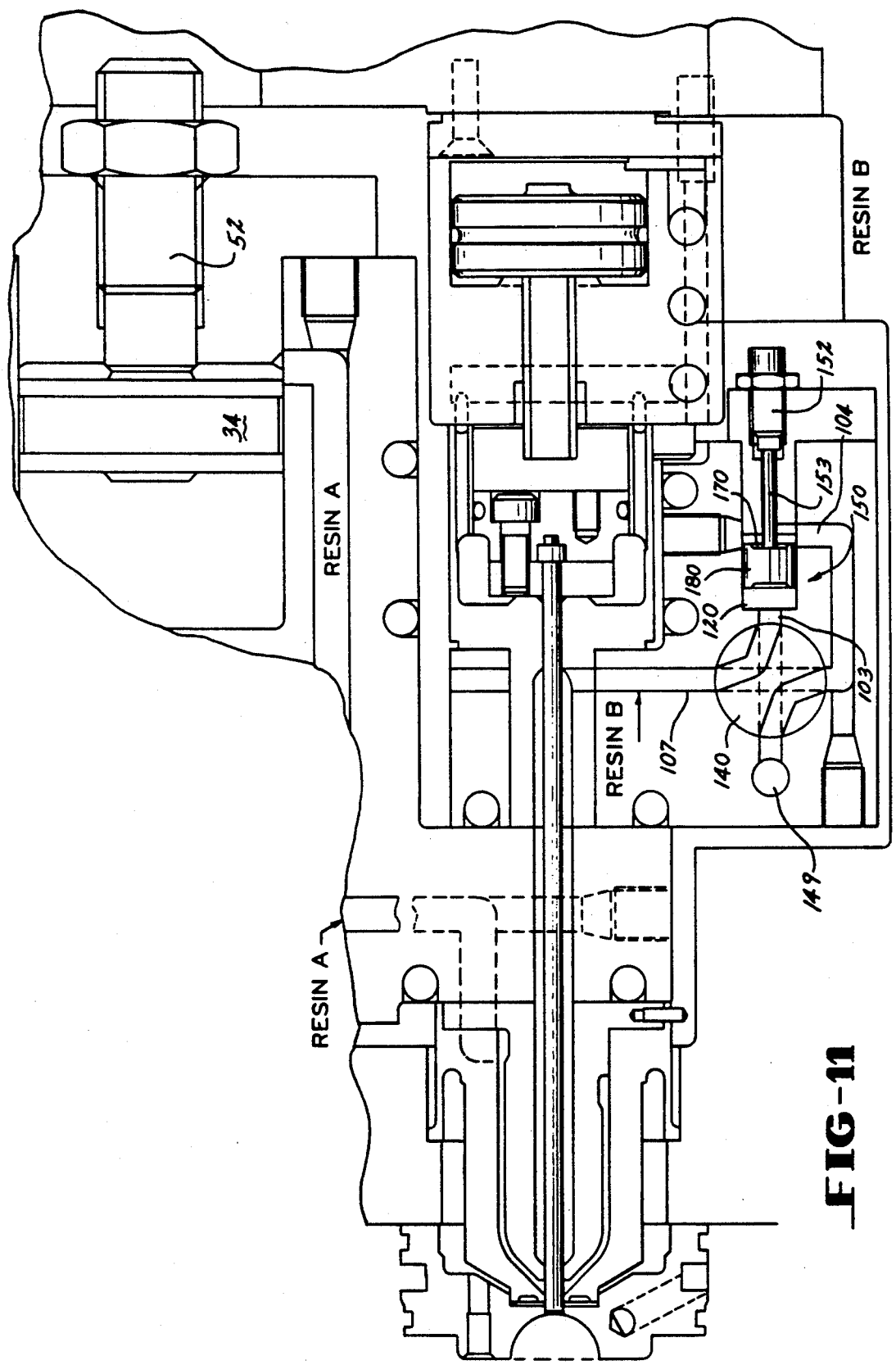
FIG. 11 shows an arrangement alternative to the layout of FIGS. 1 through 10 wherein the resin B shooting pot is modified and is of the same general configuration as resin A shooting pot.

FIG. 11 is a layout of a hot runner system similar to the layout of FIG. 1 wherein an alternative shooting pot 150 has been substituted for advancing resin B.

That is, the tubular floating shooting pot piston 18 of FIG. 1 has been replaced by a floating piston 180 similar in structure and operation to the resin A shooting pot piston 34.

Resin B supplied under pressure at aperture 149 from a source such as an extruder (not shown), is directed to a three position valve 140 operable to switch resin B to opposed working surfaces of piston 180 via ports 103 and 104, respectively, to load reservoirs 120 and 170.

As described, with respect to the Resin A shooting pot, the valve 140 is also operable to switch the loaded reservoirs to nozzle channel 107.

The valve 140, in its 3rd position, blocks nozzle channel 107 to prevent backflow when resin A is being injected.

FIG. 11 also includes an alternative arrangement in both the resin A and resin B shooting pots, wherein adjustable stops 52 and 152, respectively, enhance the accuracy and integrity of the volumetric metering on a cavity by cavity basis. That is, the respective pistons 34 and 180 remain free floating but an abutting rod, such as threaded rod 153, is movable to change a piston stroke.

Figure 12:
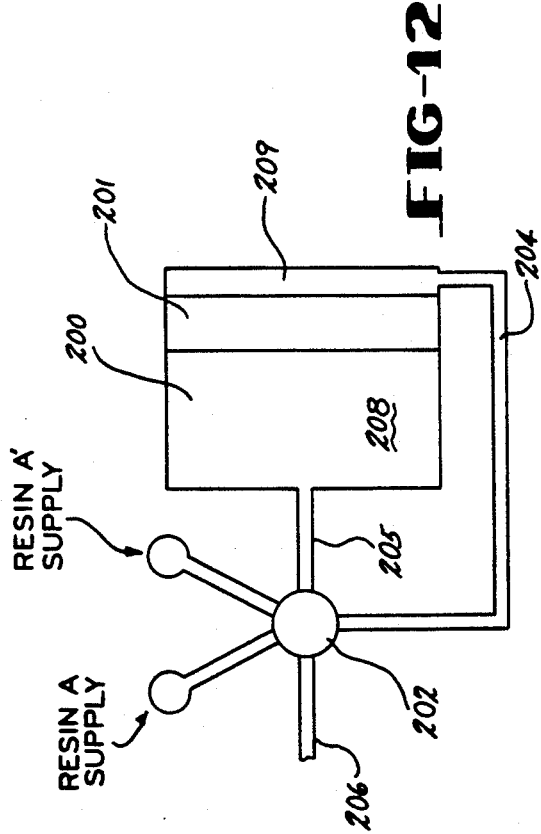
FIG. 12 shows, schematically, an arrangement wherein the left reservoir of a single shooting pot can be loaded with resin A and the right reservoir loaded with a compatible resin A'.
Figure 12A:
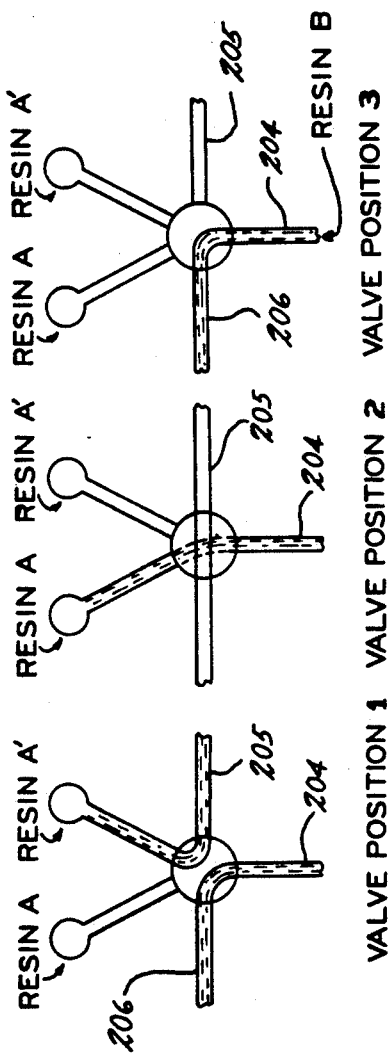
FIG. 12A shows, schematically, a conduit and valve system for directing resins A and A' to the shooting pot of FIG. 12 and for directing resin B to a mold cavity by-passing the shooting pot of FIG. 12.

FIGS. 12 and 12A show schematically a layout whereby a single shooting pot having a free floating piston is used to supply two different resins each having similar processing characteristics to the same mold cavity.

That is, free floating piston 201 of shooting pot 200, receives two different resins A and A' under control of three position valve 202 to load and discharge reservoirs 208 and 209, respectively, in the fashion described in detail with respect to the charging and discharging of shooting pot 32 with a single resin A (FIG. 1).

In valve position 1, (FIG. 12A) resin source A' is directed to reservoir 208 via channel 205 and reservoir 209 is connected to outlet 206 (leading to mold cavity) via channel 204.

In valve position 2, resin A is directed to reservoir 209 via channel 204 and reservoir 208 is connected to mold cavity outlet 206 via conduit 205.

In valve position 3, all channels of resins A and A' to the shooting pot 200 are closed so that when a third resin B under pressure (a) issuing from another shooting pot or (b) being delivered directly (bypassing all shooting pots) will not back flow into the reservoirs of shooting pot 200 handling resins A and A'.

Figure 13:
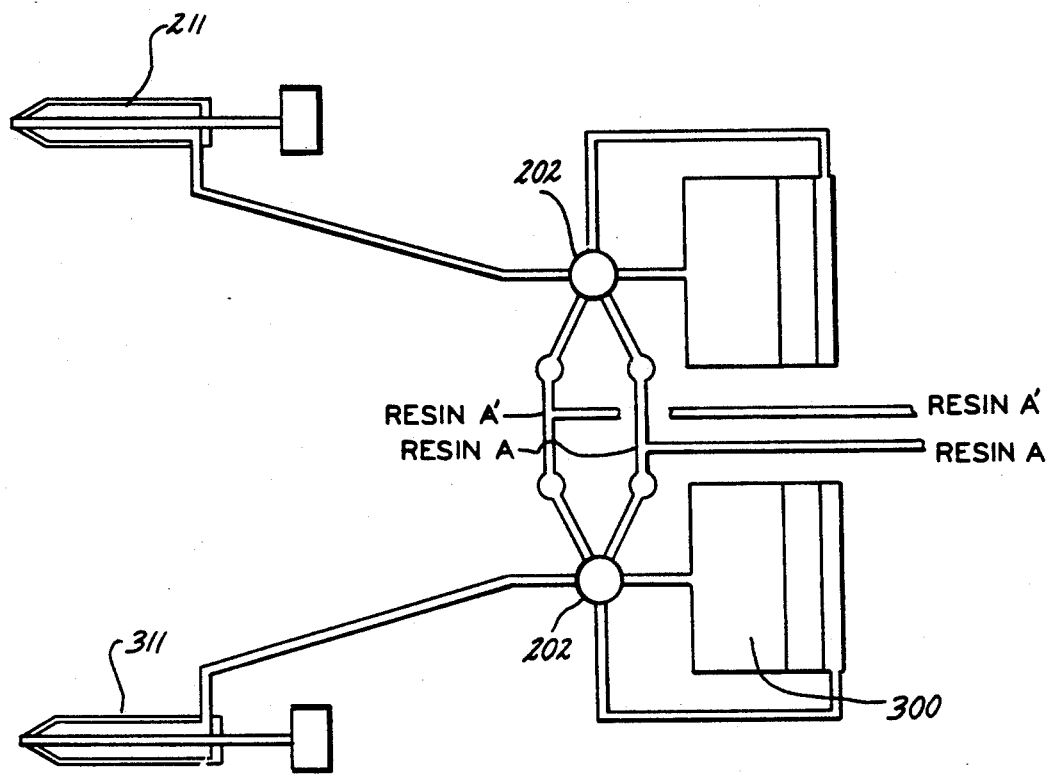
FIG. 13 shows a typical layout further implementing the arrangement of FIGS. 12 and 12A wherein two resins of similar processing characteristics are loaded on opposite sides of a free floating piston.
Figure 14:
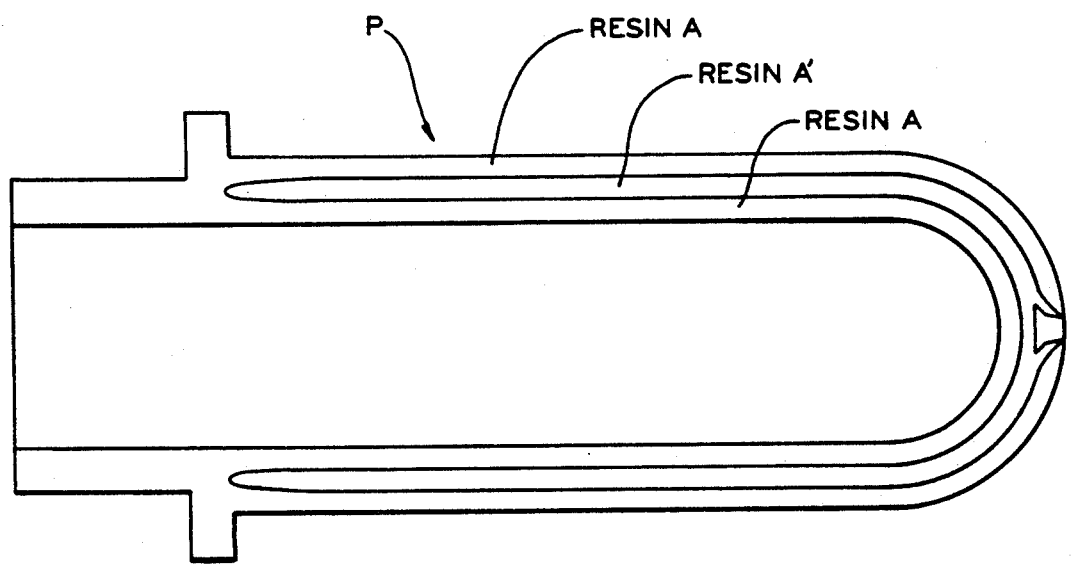
FIG. 14 is a sectional view of a 3 layer preform molded by the 2 resin layout of FIG. 13.

FIGS. 13 and 14 show a typical layout wherein the arrangement of FIGS. 12 and 12A are implemented further to create a preform or molded article P using two resins A and A' of similar processing characteristics to create a three layered article.

That is, by use of the valve system described with respect to FIGS. 12 and 12A, resin A and resin A' are fed to a single shooting pot 200 to service nozzle 211. Correspondingly, shooting pot 300 serves nozzle 311.

Obviously, the valve operation could be arranged so that resin A serves both nozzles 211 and 311 in a single shot of one shooting pot, 200 for example, and resin A' in sequence serves nozzles 211 and 311 in a single shot of the same shooting pot, as engineering and design considerations dictate.

Resin A and resin A' enjoy similar processing characteristics because one resin, PET for example, may be virgin material and the other may be recycled or repolymerized PET.

Figure 15:
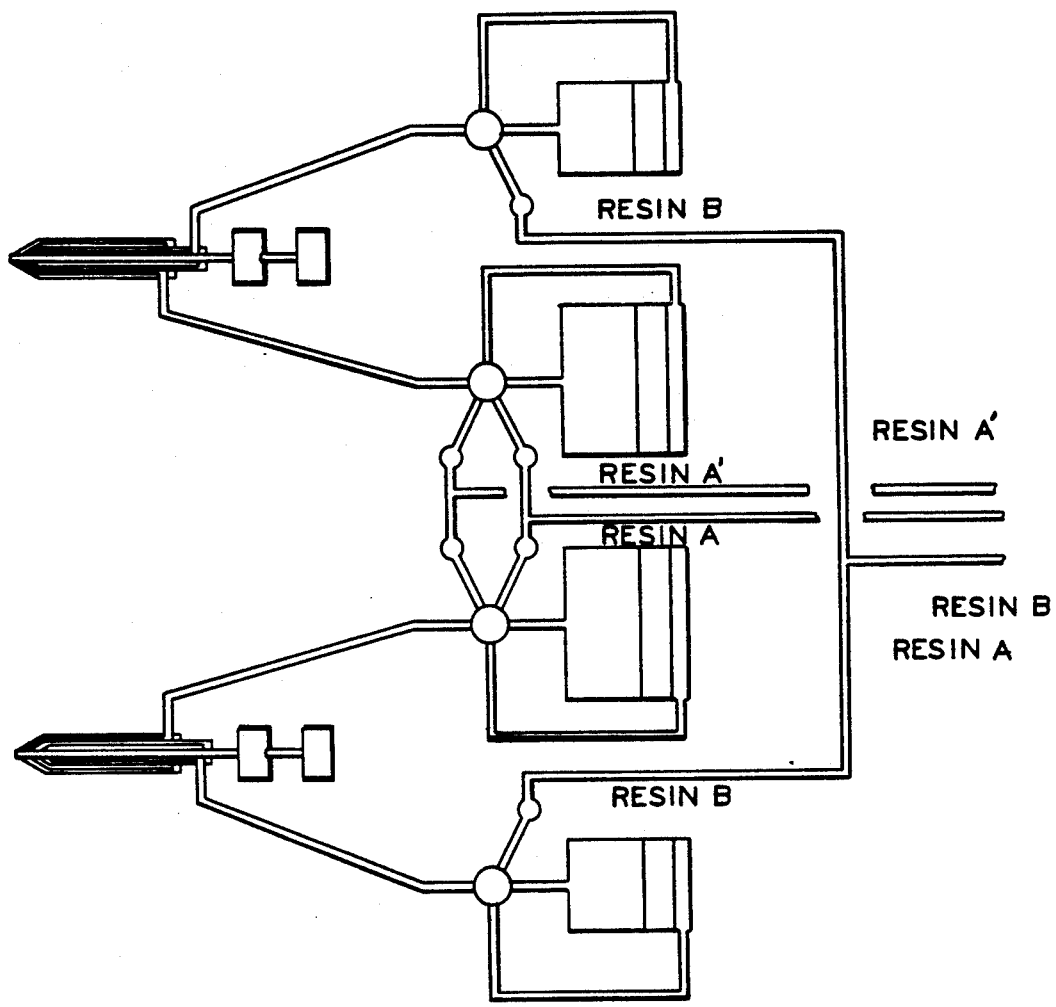
FIG. 15 is a schematic layout of a hot runner system wherein two nozzles are each supplied from three different resin sources.
Figure 16:
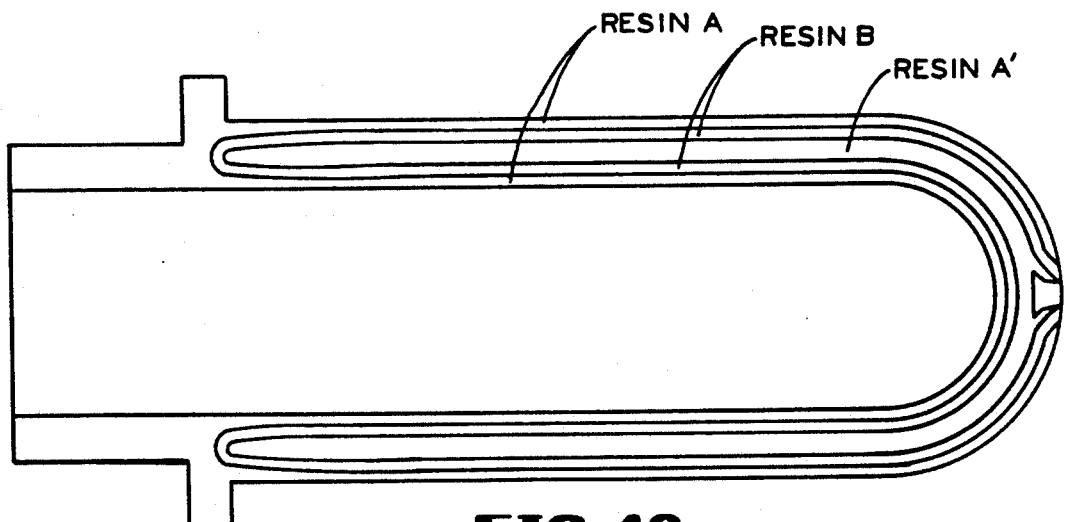
FIG. 16 is a sectional view of a 5 layer preform molded by the 3 resin layout of FIG. 15.

FIGS. 15 and 16 show a more sophisticated layout in which a third resin B is included in the system wherein resin B is metered to respective nozzles via individual shooting pots.

Here again, resins A and A' are metered by shooting pots individual to each nozzle.

This layout embracing resin A, resin A' and resin B produces a five layered article, as shown in FIG. 16.

It is to be understood that the choice of using a single shooting pot having a free floating piston with opposed working surfaces to service more than one nozzle is a matter of choice and depends upon the relative volumes of the respective resins necessary to mold the multi-layered article in question. The sequence of injecting the resins is also a matter of choice.

Figure 17:
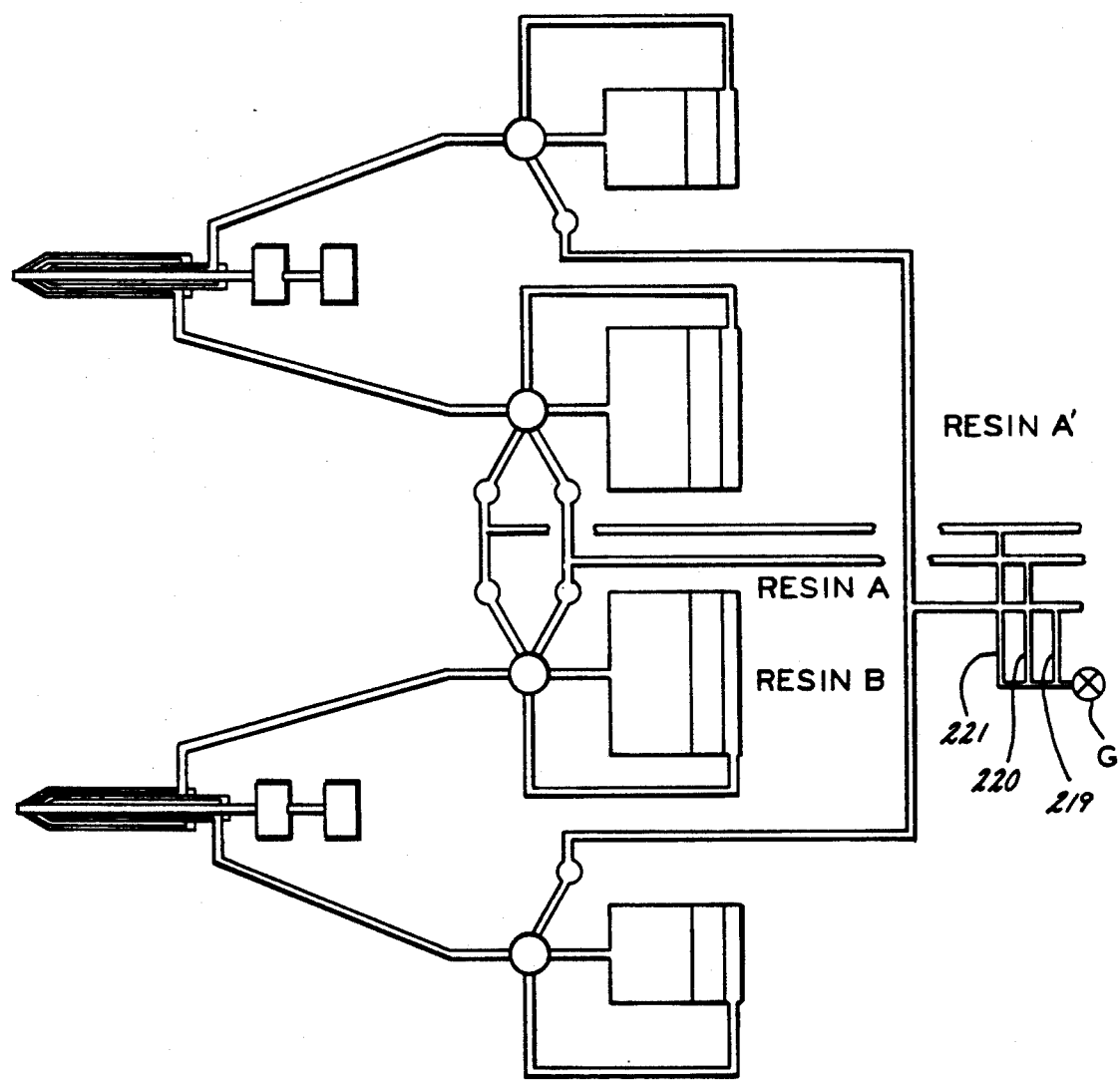
FIG. 17 is a schematic layout of a hot runner system (similar to FIG. 15) showing a method of purging the system.

FIG. 17 is a layout similar to FIG. 15 wherein auxiliary inlets 219, 220 and 221 connected to the respective resin channels supply an inert gas G under pressure to purge the system after shutdown so that residual resin does not "freeze" or overheat making for a difficult time and energy consuming start-up when molding operations are renewed.

Figure 18:
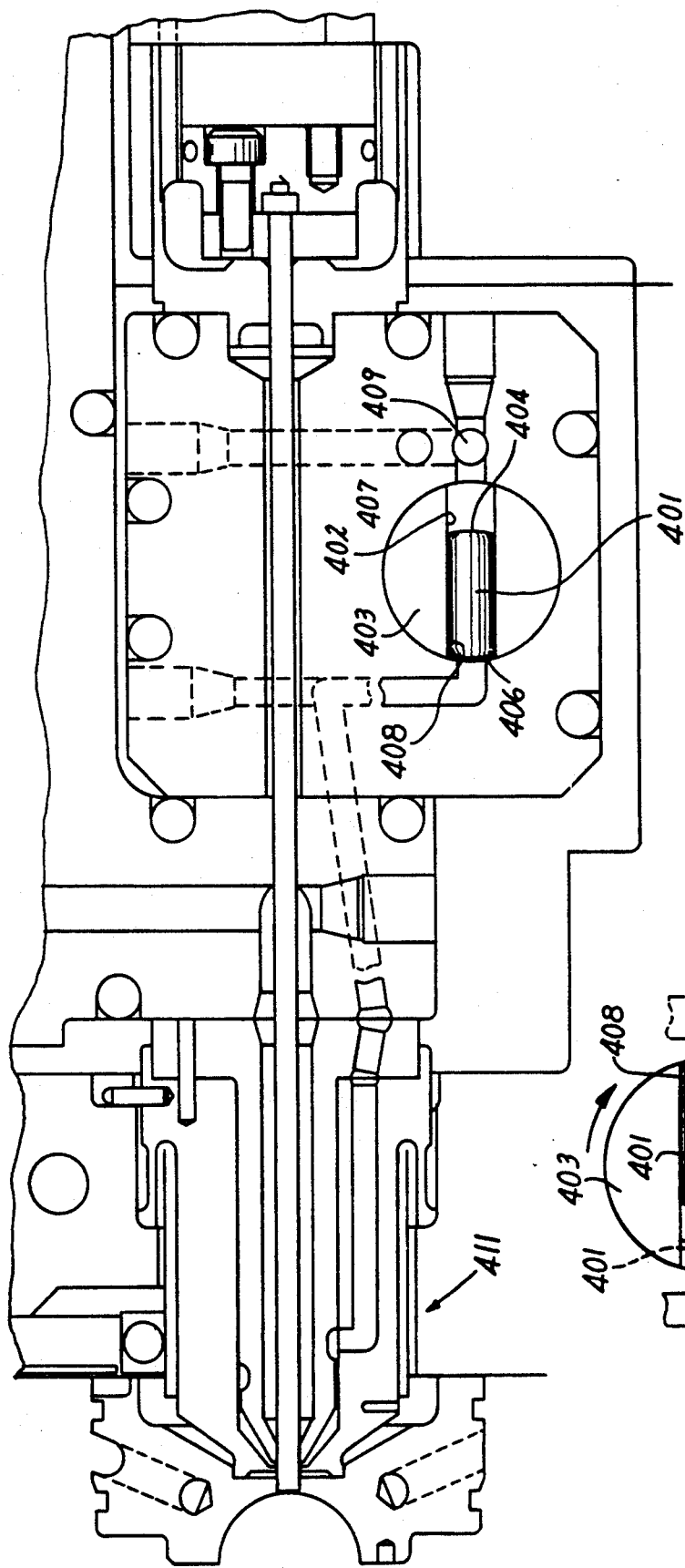
FIG. 18 is a schematic layout showing an alternative shooting pot structure.
Figure 18A:
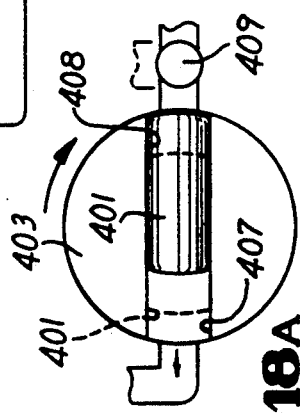

FIGS. 18 and 18A show an alternative embodiment of a shooting pot wherein a free floating piston 401 within cylinder 402 is contained in a rotatable shaft 403.

The piston includes opposed working surfaces 404 and 406 with complementary reservoirs 407 and 408, respectively.

In FIG. 18, reservoir 407 is shown loaded with a charge of resin under pressure supplied at orifice 409 destined for nozzle 411.

In timed sequence, shaft 403 is rotated 180° to the position of FIG. 18A where, upon an appropriate signal from a control unit, additional resin is fed from supply orifice 409 with the result that the resin in reservoir 407 is ejected while reservoir 408 is loaded. The stroke of the free floating piston is from end to end of the cylinder. The dashed lines in FIG. 18A are provided to show progress of the piston from right to left.

Precise volume can be controlled by the size of the bore of the cylinder, its stroke and the size of the piston.

Note that the piston always loads on the right side and injects from the left side by virtue of the rotation of shaft 403.

The beauty of this floating piston arrangement resides in the fact that all resin is ejected or purged on each stroke of the shooting pot and there is no danger that small amounts of resin will remain in the shooting pot facing decomposition or affecting the integrity of the precise shooting pot charge.

Furthermore, this rotatable shooting pot lends itself to handling very small quantities (such as less than 1 gram) of resin with excellent control of volume on a shot by shot basis.

Figure 19:
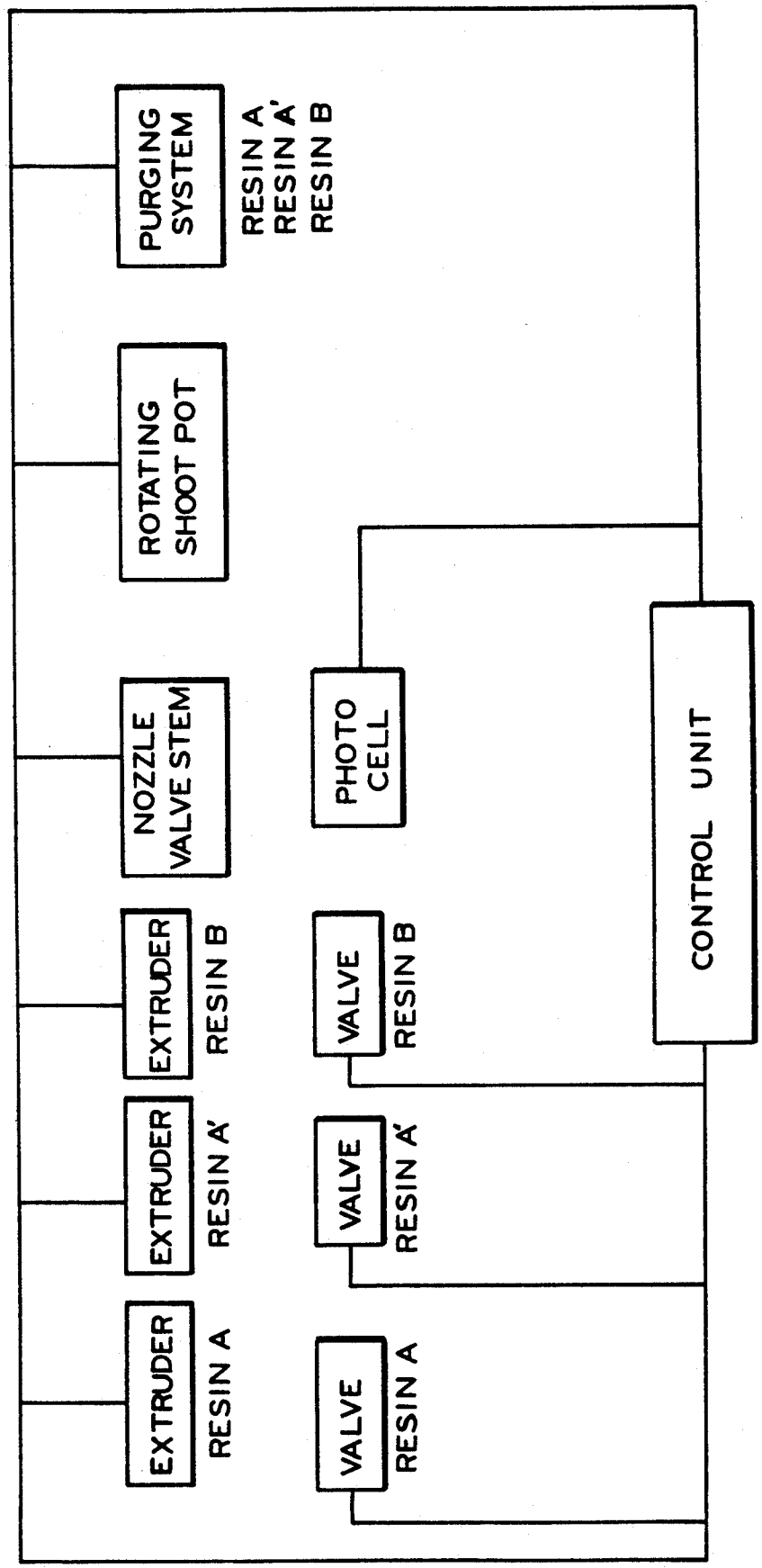
FIG. 19 is a block diagram showing the control system for cycling the various elements of the hot runner system in advancing metered quantities of the various resins from their source to the mold cavities.

FIG. 19 is a block diagram of the control unit for sequencing the various elements of the system.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A nozzle assembly for an injection molding machine comprising, in combination,
    a nozzle means having a reservoir for containing a charge of resin,
    said reservoir leading to a mold cavity via a nozzle gate,
    channel means including a port in said nozzle means leading from a source of resin under pressure to said reservoir,
    a floating piston defining a sleeve disposed in said nozzle means,
    said piston having opposed working surfaces,
    a first working surface having an area larger than the area of a second working surface whereby resin under pressure acting upon both working surfaces operates to drive said piston in a predetermined direction,
    a valve stem received in said sleeve;
    means for reciprocating said valve stem,
    said valve stem being movable from a first position in which said port is closed to a second position in which said port is open so that resin under pressure operates on both working surfaces and flows into said reservoir;
    said resin under pressure while filling said reservoir operates, by virtue of said differential areas, to drive said sleeve in said predetermined direction effective to close said port.

2. The assembly of claim 1 including stop means for limiting the stroke of said piston in said predetermined direction.

3. The assembly of claim 2 in which said valve stem is formed with a reduced diameter segment and sealing segments which facilitate opening and closing said port and sealing said gate.

4. An injection molding machine including resin conduit means providing a flow path for a resin advancing under pressure from a resin source to at least one resin mold cavity, said machine being effective to inject precise quantities of small volumes of resin into said mold comprising:
    a cylinder means in circuit with said conduit means,
    said cylinder means being rotatable in automatic cyclic fashion from a first position defining a loading position to a second position defining an ejection position,
    means for rotating said cylinder means from said first position to said second position so that resin entering the cylinder means at the loading position is poised for discharge at the ejection position,
    a free floating piston means having a definite stroke and opposed working surfaces, said surfaces being planar and free of projections, said piston means being disposed with said cylinder means so that resin under pressure entering the cylinder means at the loading position is operable to drive the piston toward the ejection position to eject resin loaded during a previous cycle during a single stroke of the piston means whereby loading and ejection of resin occurs simultaneously,
    the stroke of the piston means being equal to the end to end dimension of the cylinder,
    the size of the cylinder bore and the stroke and size of the piston means being controlled so that upon each stroke of the piston means a precise quantity of resin is advanced along said flow path and the cylinder is purged of all resin upon each stroke.

5. The molding machine of claim 4 in which the first and second positions are diametrically opposite and the cylinder means is rotated through an arc of 180°.

6. The molding machine of claim 4 in which the precise quantity of resin is less than 1 gram.

* * * * *